Feb. 21, 1939.  W. F. GROENE ET AL  2,148,348
TURRET LATHE
Filed Sept. 27, 1937   16 Sheets-Sheet 1
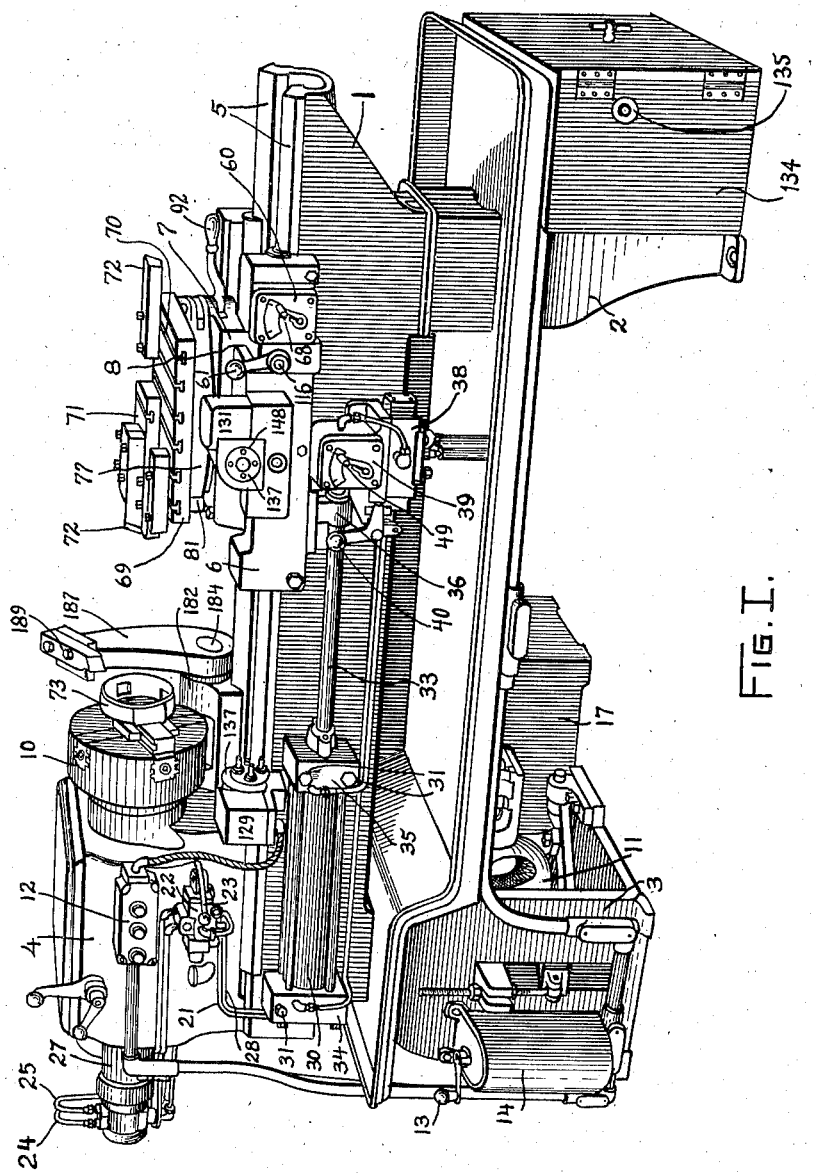
FIG. I.
INVENTORS.
WILLIAM F. GROENE
HAROLD J. SIEKMANN
BY Willard S. Groene
ATTORNEY.

Feb. 21, 1939.　　W. F. GROENE ET AL　　2,148,348
TURRET LATHE
Filed Sept. 27, 1937　　16 Sheets-Sheet 2
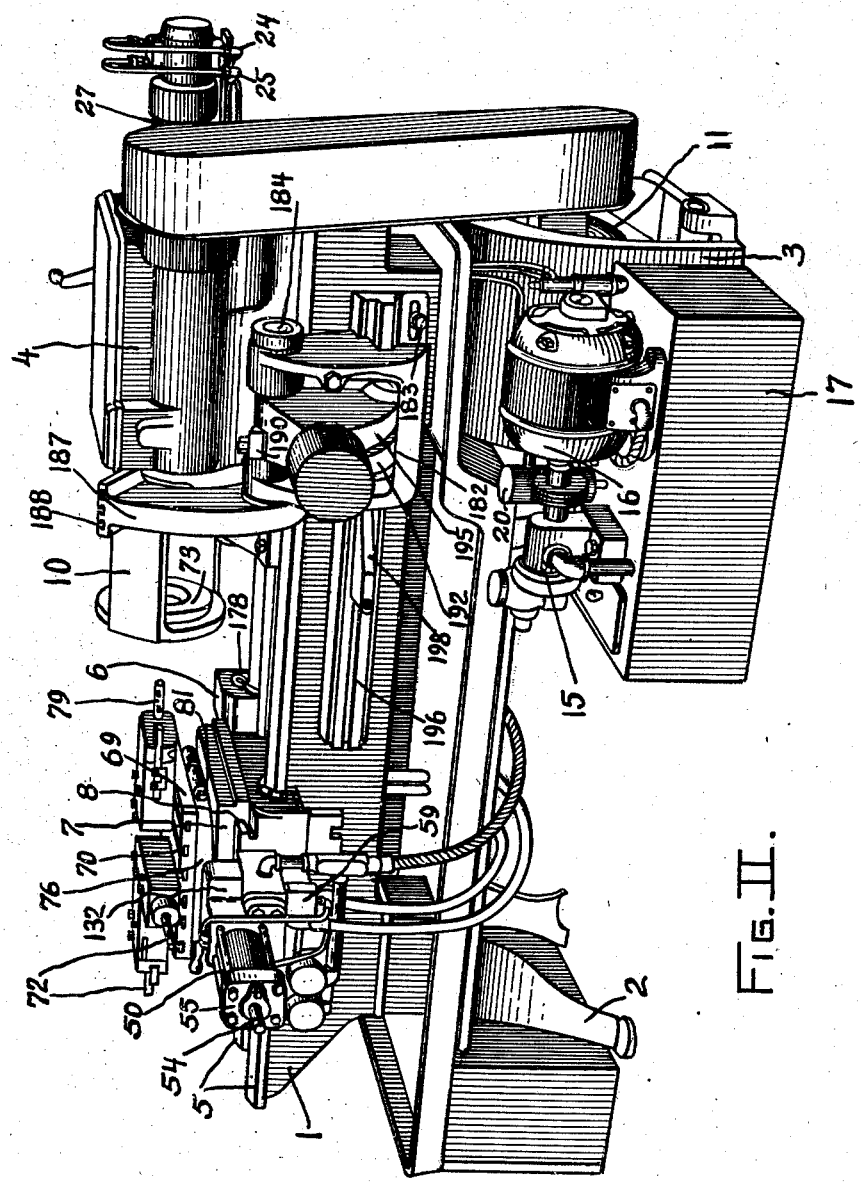
FIG. II.
INVENTORS.
WILLIAM F. GROENE
HAROLD J. SIEKMANN
BY Willard L. Groene
ATTORNEY.

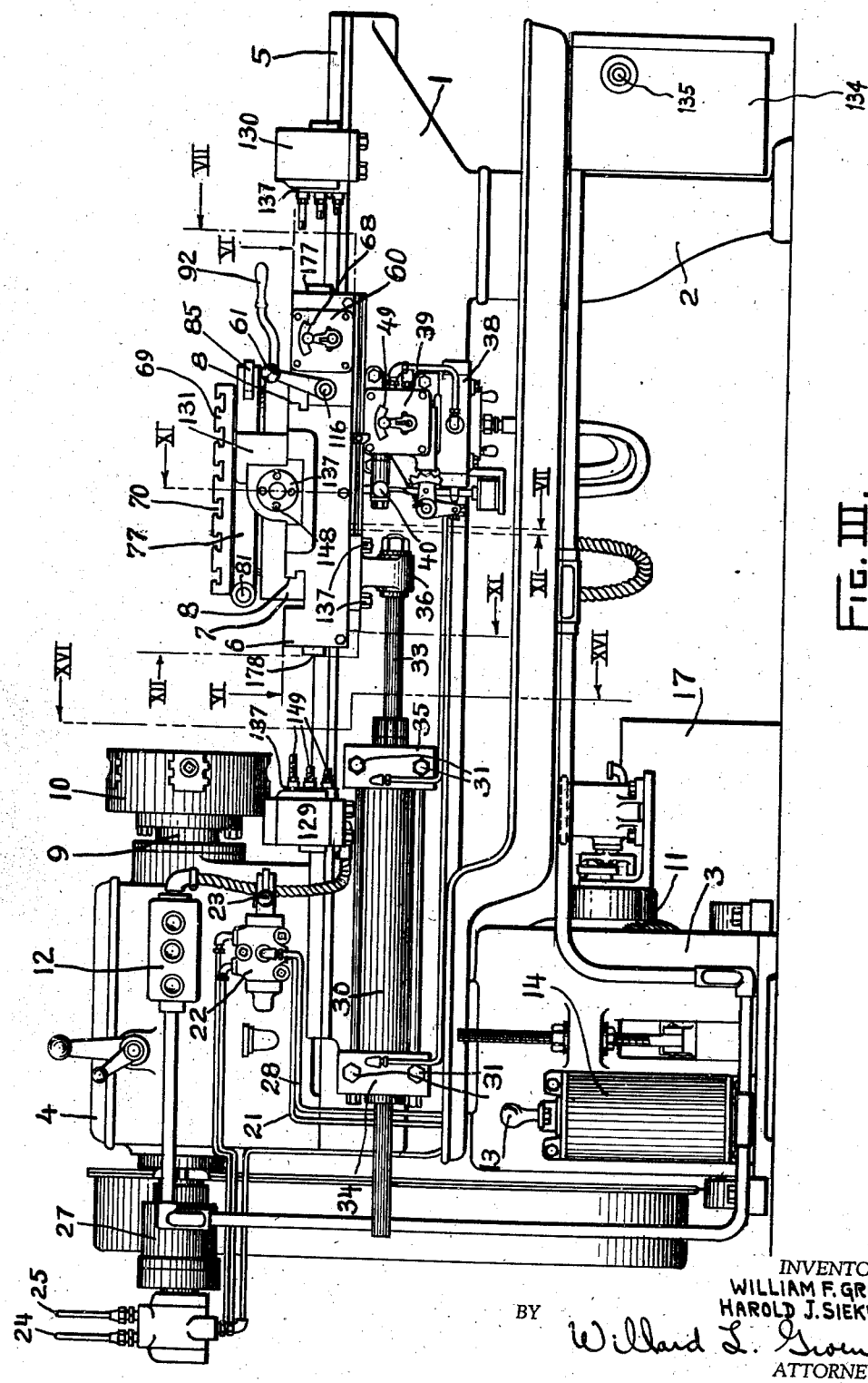

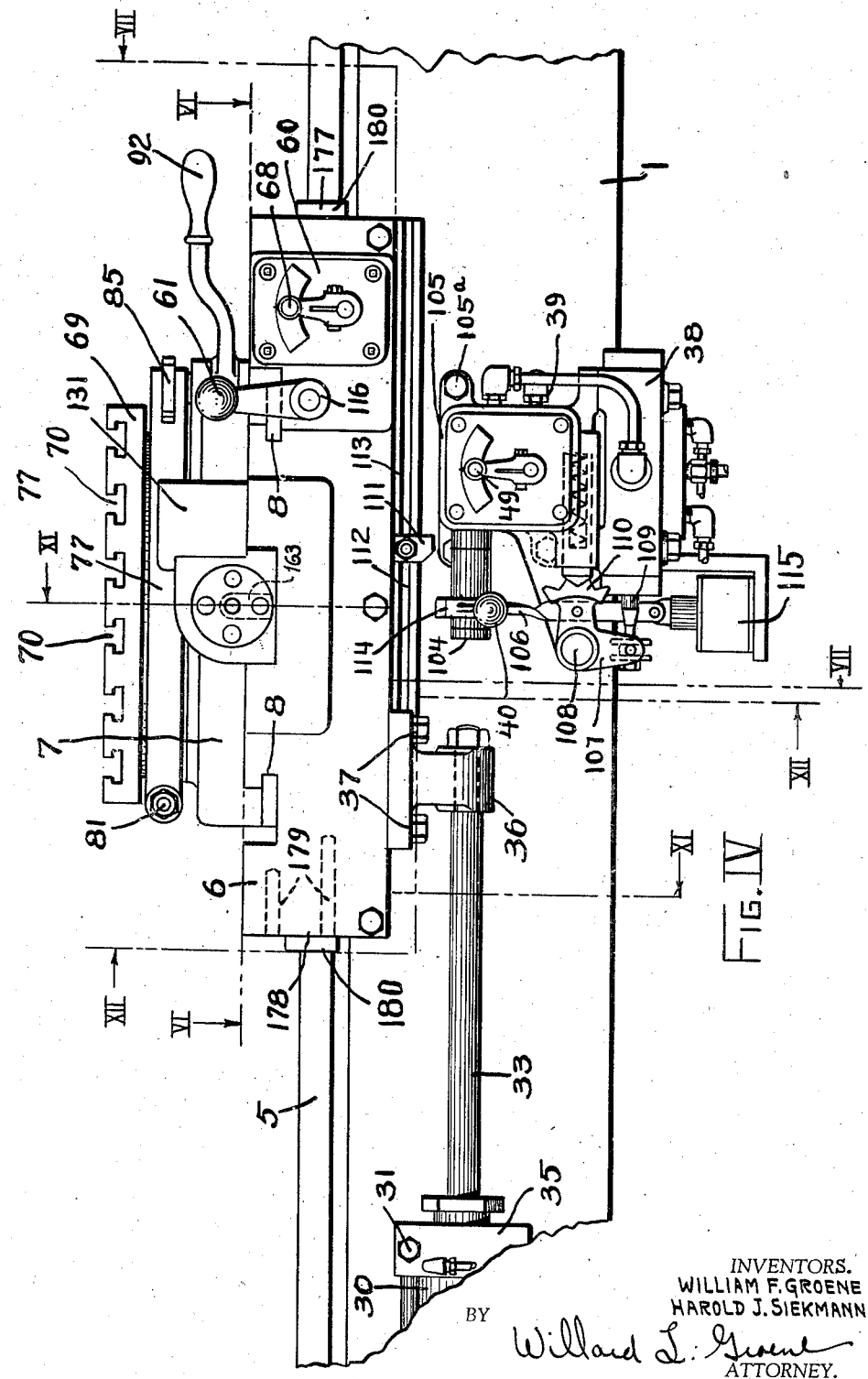

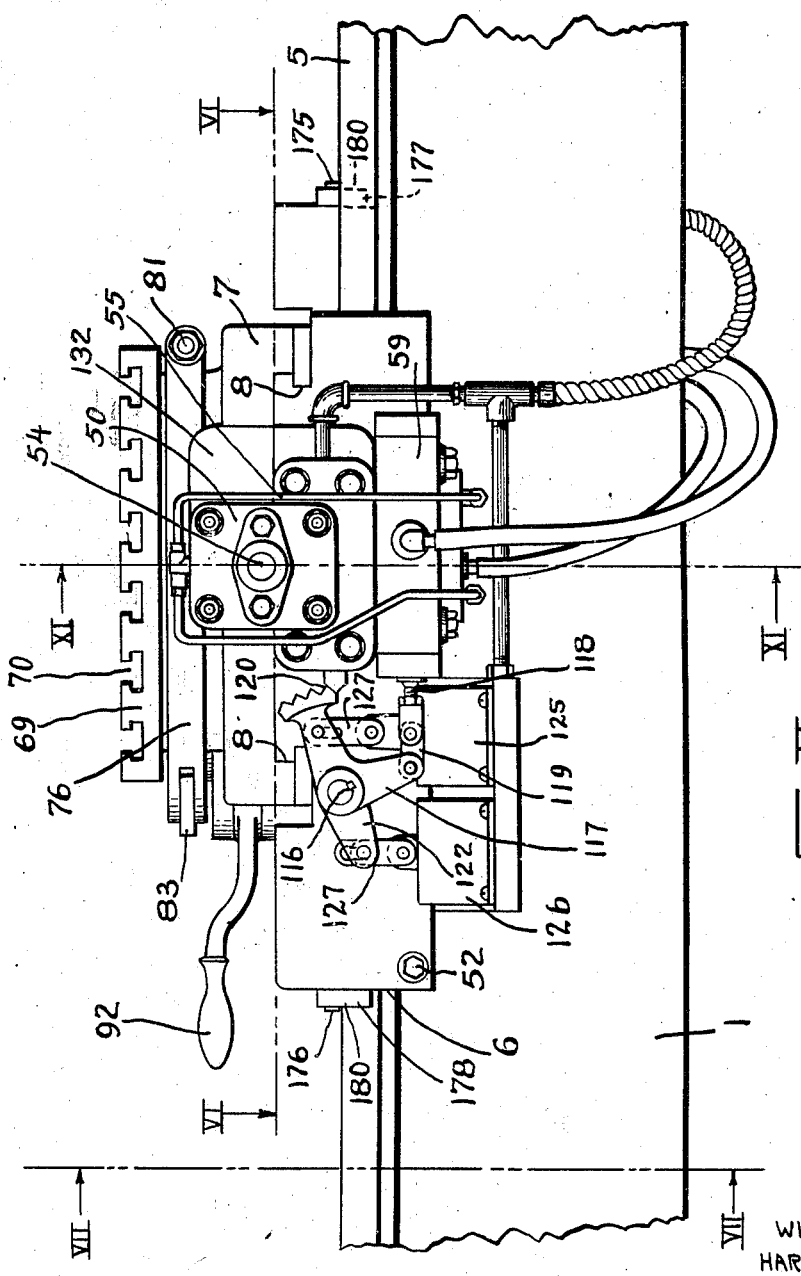

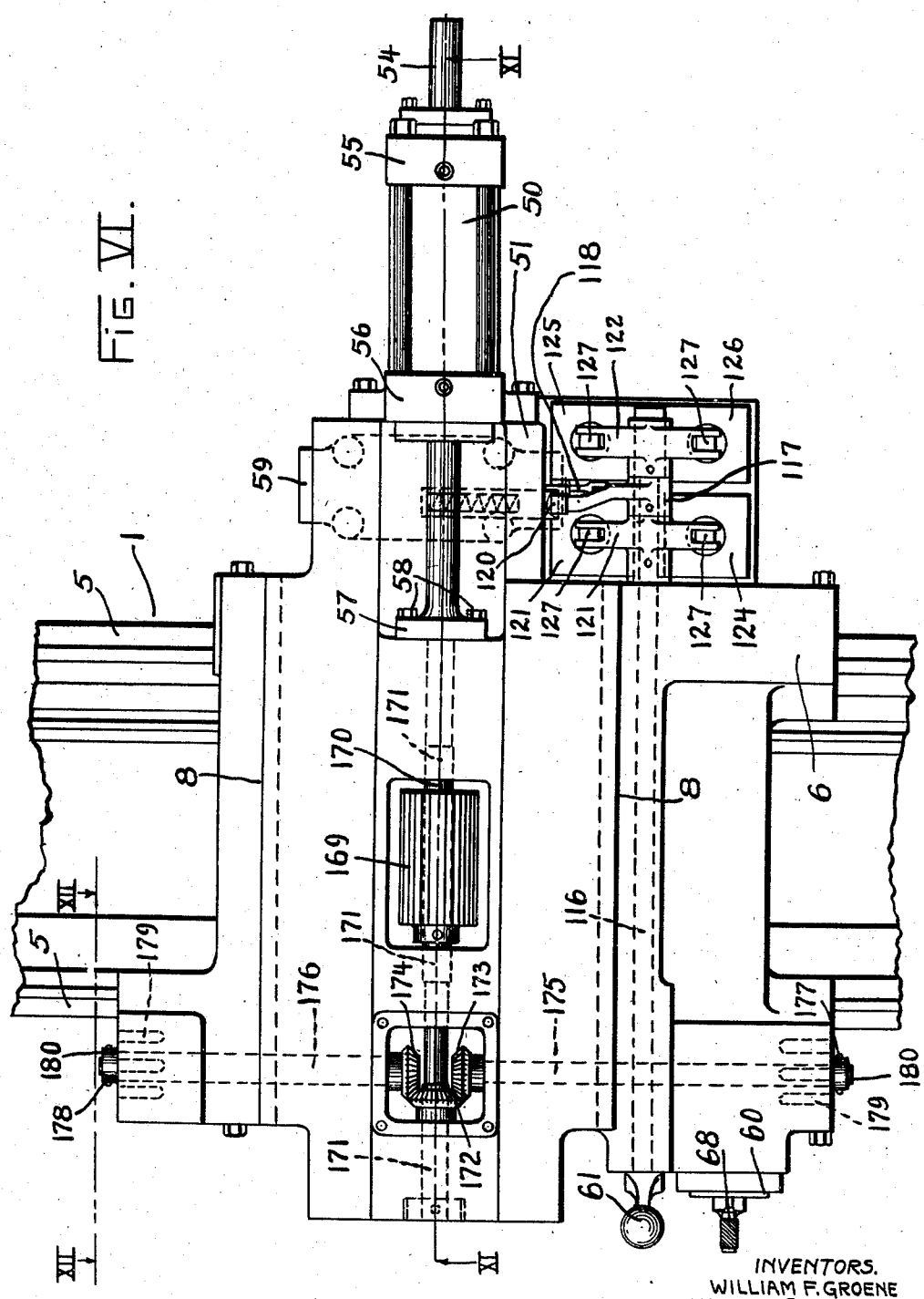

Feb. 21, 1939.  W. F. GROENE ET AL  2,148,348
TURRET LATHE
Filed Sept. 27, 1937  16 Sheets-Sheet 7
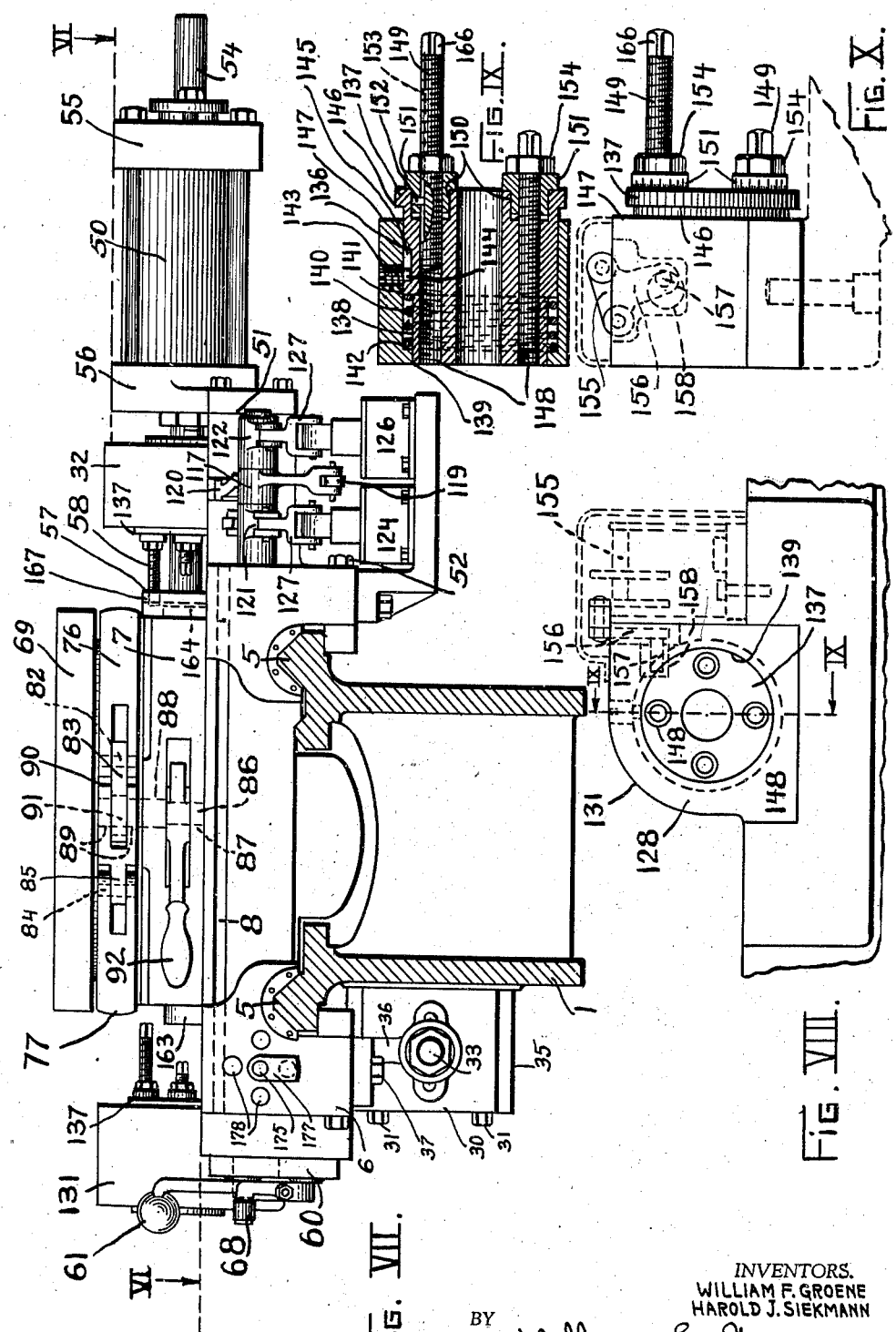
INVENTORS.
WILLIAM F. GROENE
HAROLD J. SIEKMANN
BY Willard L. Groene
ATTORNEY.

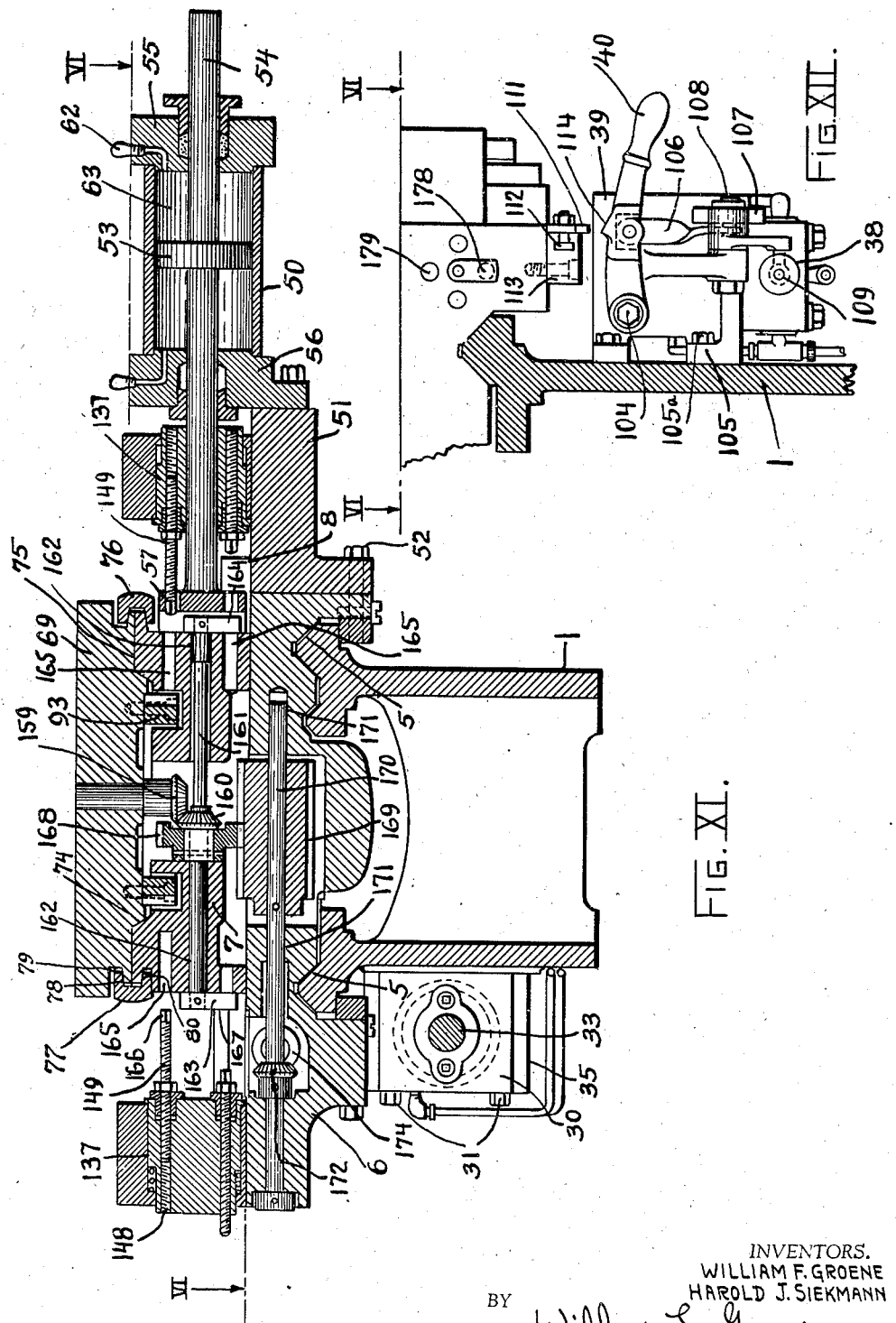

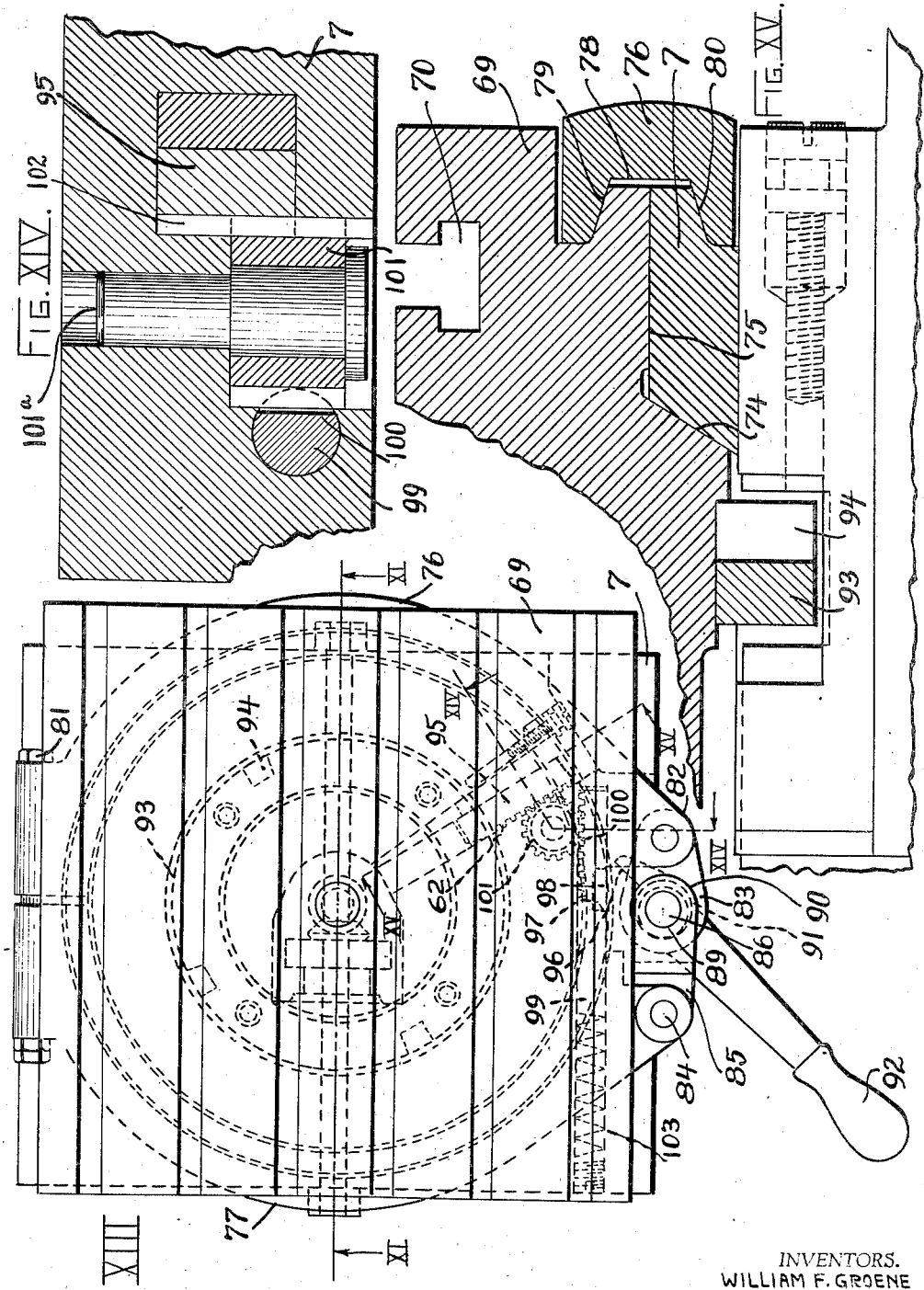

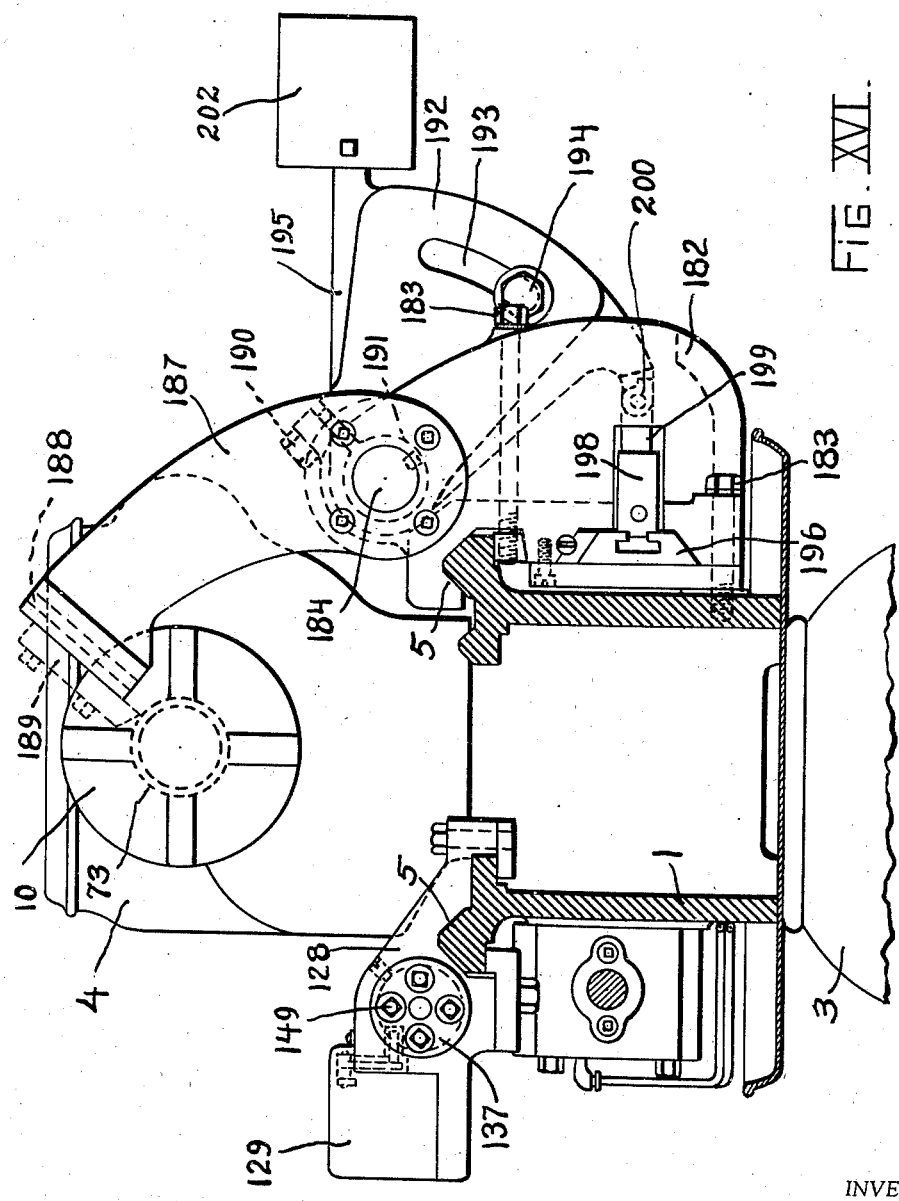

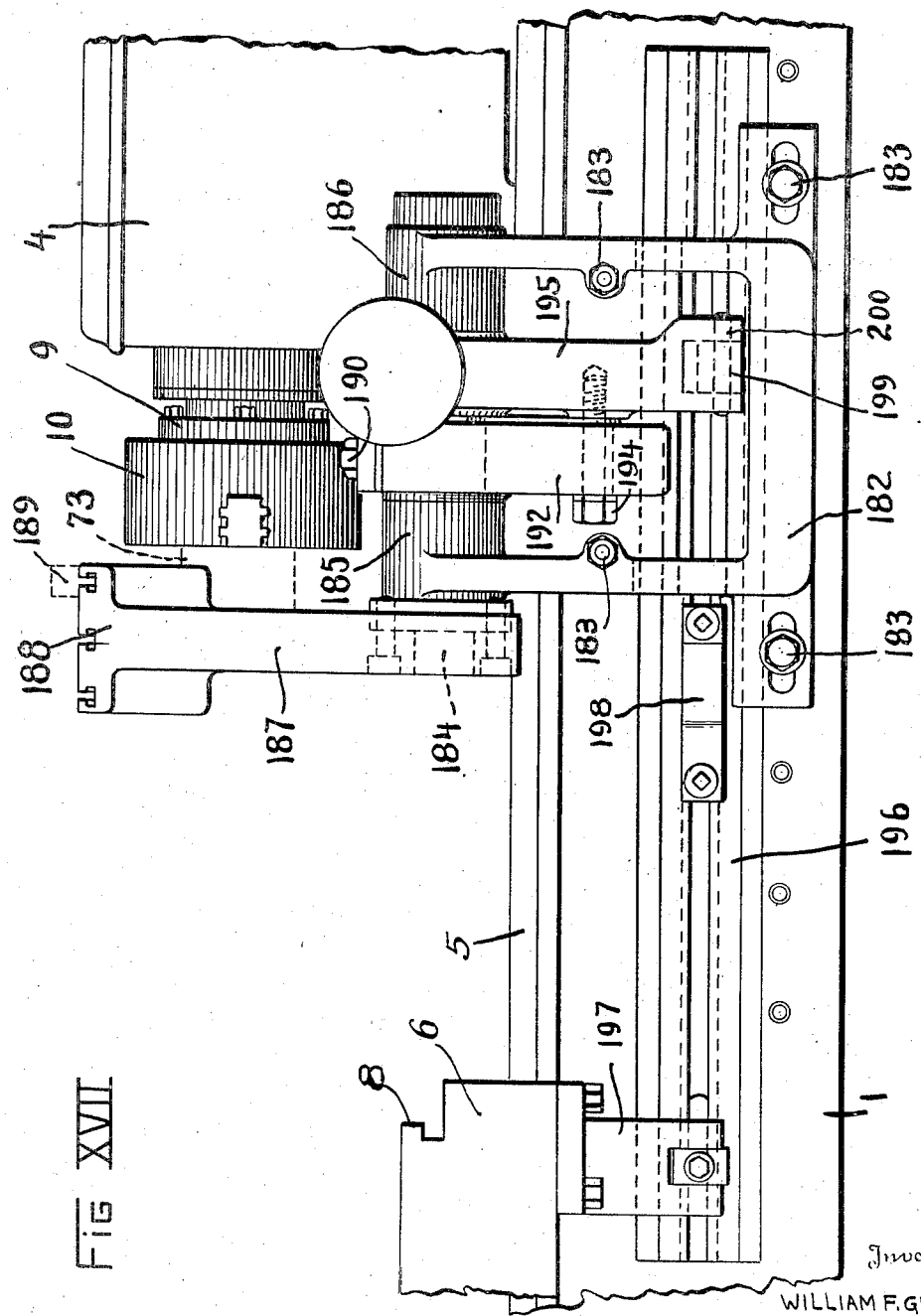

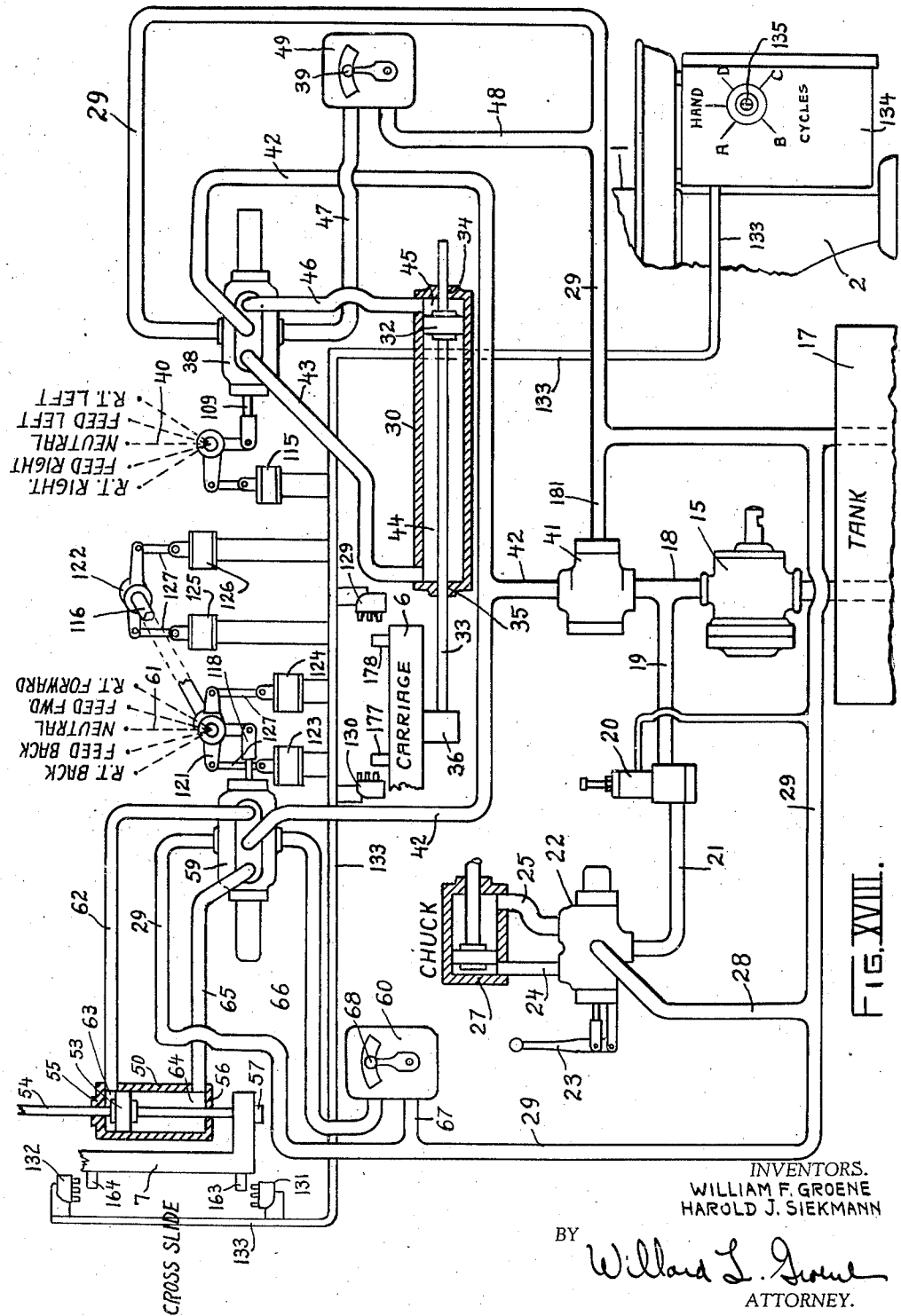

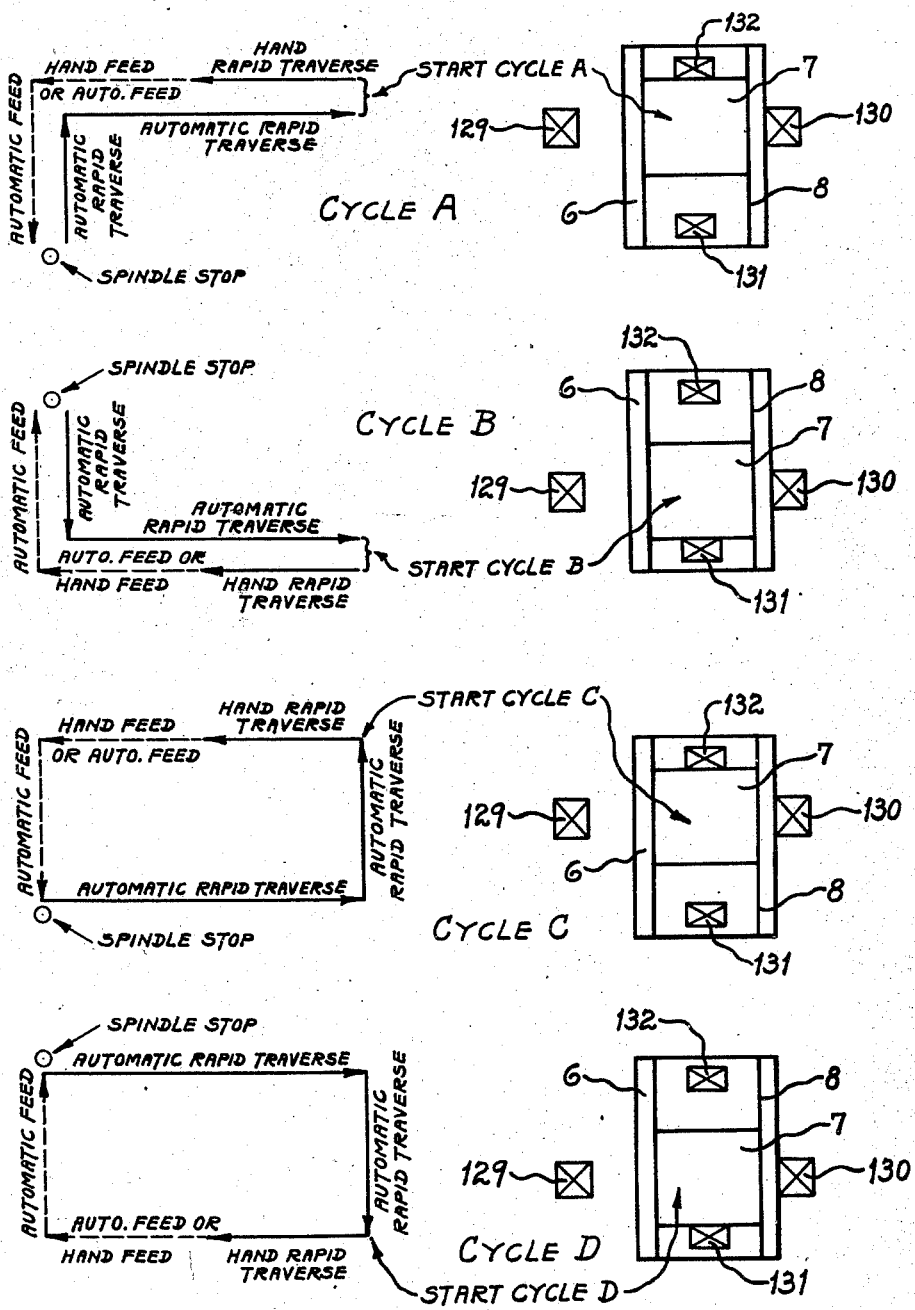

Feb. 21, 1939.  W. F. GROENE ET AL  2,148,348
TURRET LATHE
Filed Sept. 27, 1937  16 Sheets-Sheet 14
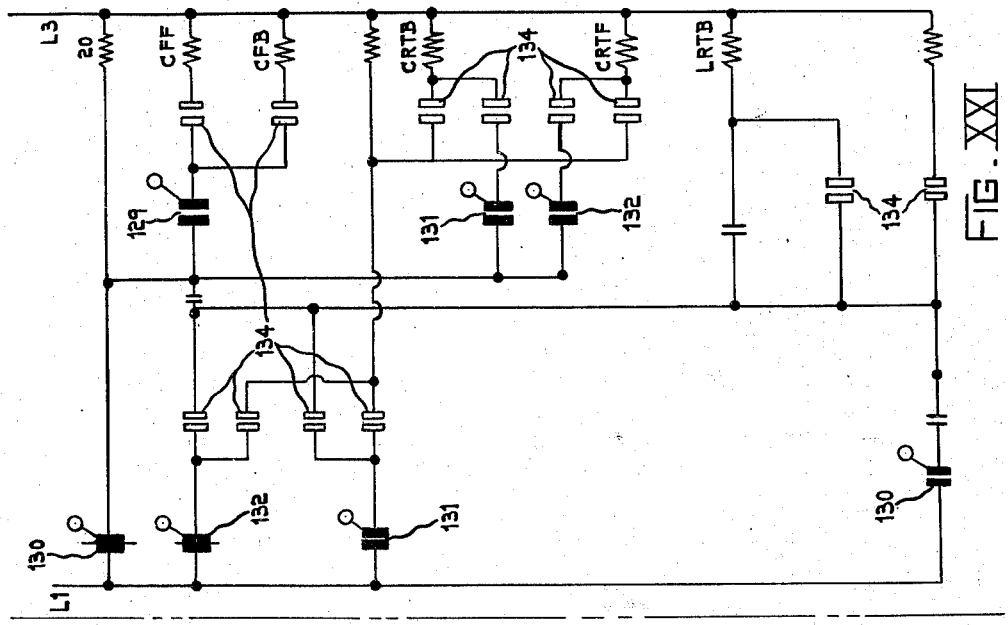
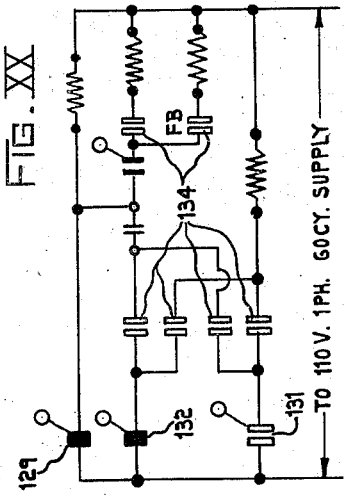
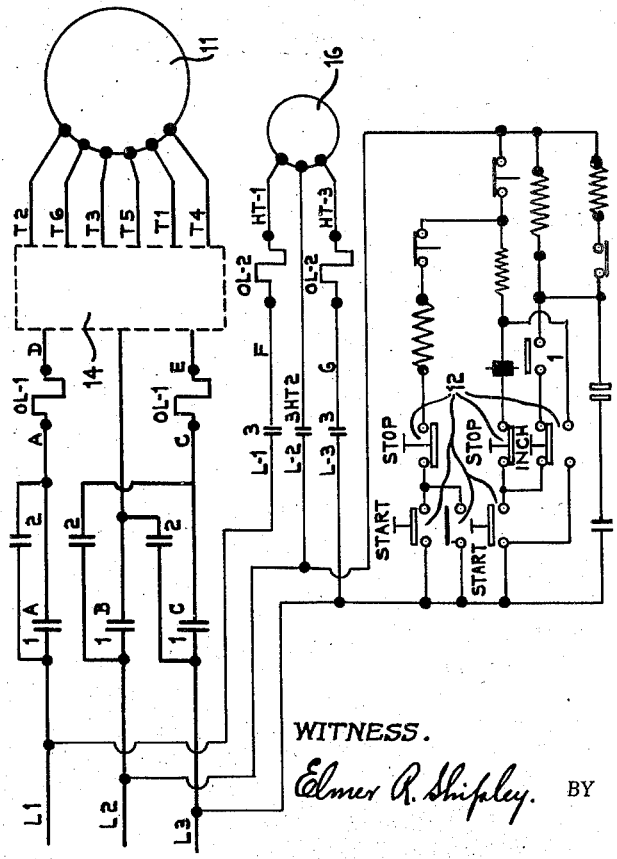
WITNESS.
Elmer R. Shipley.
INVENTORS.
WILLIAM F. GROENE
HAROLD J. SIEKMANN
BY Willard S. Groene
ATTORNEY.

Feb. 21, 1939.  W. F. GROENE ET AL  2,148,348
TURRET LATHE
Filed Sept. 27, 1937   16 Sheets-Sheet 15
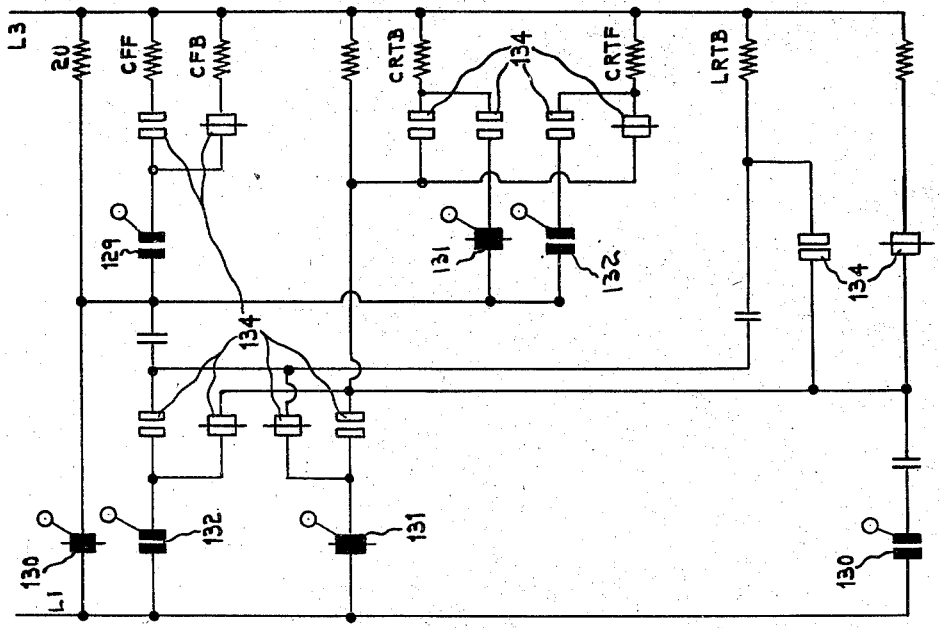
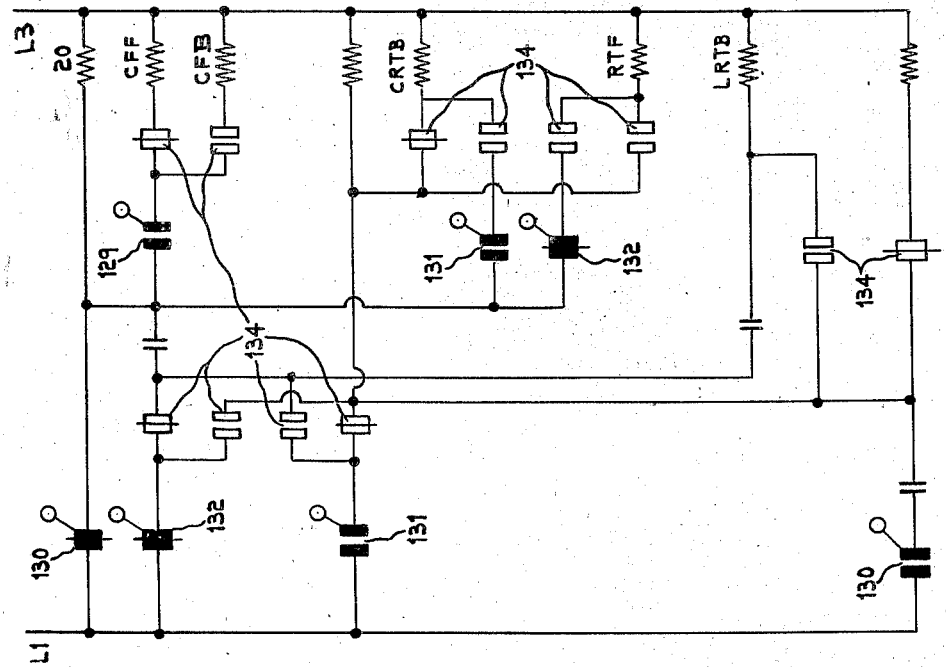
WITNESS.
Elmer R. Shipley
INVENTORS.
WILLIAM F. GROENE
HAROLD J. SIEKMANN
BY Willard L. Groene
ATTORNEY.

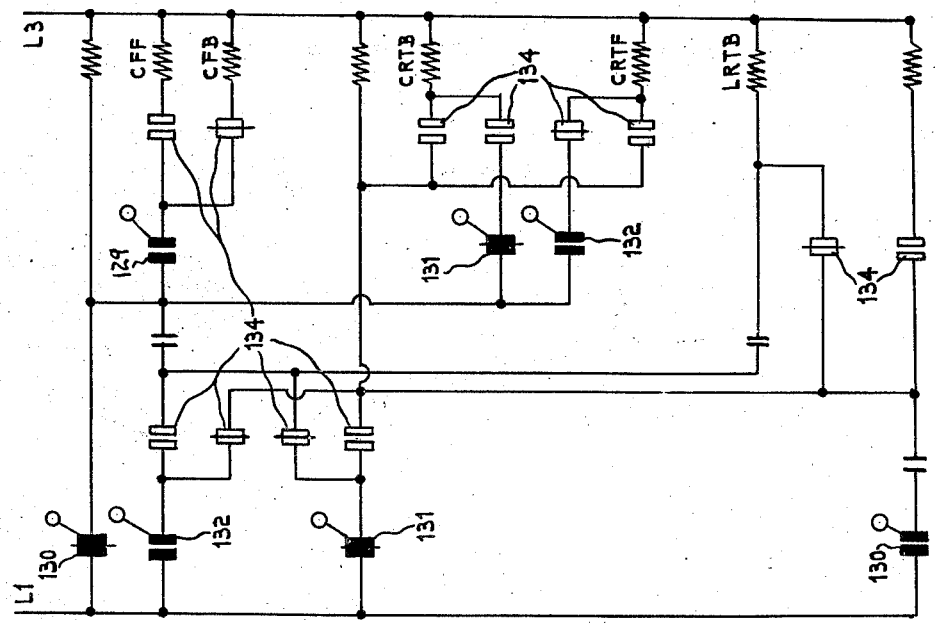
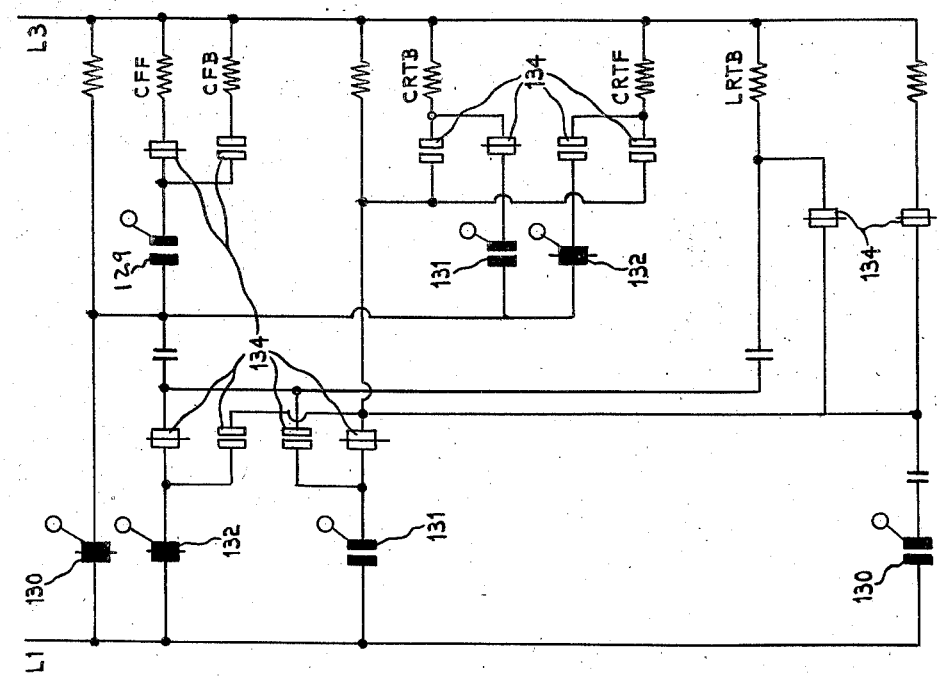

Patented Feb. 21, 1939

2,148,348

UNITED STATES PATENT OFFICE 2,148,348

TURRET LATHE

William F. Groene and Harold J. Siekmann, Cincinnati, Ohio, assignors to The R. K. Le Blond Machine Tool Company, Cincinnati, Ohio, a corporation of Delaware Application September 27, 1937, Serial No. 165,835

8 Claims. (Cl. 29—42)

This invention pertains to lathes and more particularly to turret lathes and related mechanism for actuating the tool carriage in longitudinal and cross travel. Heretofore, lathes of this character, especially such lathes which were mechanically operated, were extremely complex in structure making them very difficult and requiring a great deal of time to set up for each particular work piece to be done. It is therefore the chief purpose of our invention to construct such a lathe which is extremely flexible; which provides quick and easy set up; ease and simplicity of control; and which may be changed over from one job to another with a minimum expenditure of time and effort on the part of the operator.

More specifically, an object of our invention is to provide a simplified hydraulic feeding mechanism for reciprocating the carriage and cross slide in rapid traverse and feeding movements.

Another object is to provide hydraulic feeding mechanism for reciprocating the carriage and cross slide in which a single lever is provided for the carriage and a single lever is provided for the cross slide whereby the operation of said carriage and cross slide in rapid traverse and feed in either direction may be fully controlled by said levers.

It is also an object of our invention to provide a feed rate control mechanism for regulating the carriage feed and a feed rate control mechanism for regulating the cross slide feed.

Another object is to provide in a lathe having a hydraulic feeding mechanism for the carriage and cross slide a feed rate control mechanism for the carriage mounted on the bed and to mount the feed rate control mechanism for the cross slide on the carriage.

A further object is to provide simplified electrical control means for the hydraulic feeding mechanism whereby the carriage and cross slide may be actuated in rapid traverse and feeding movements in predetermined sequential relationships.

A still further object is to provide simplified electrical control means for the hydraulic feeding mechanism whereby the extent of the carriage and cross slide feed travel may be accurately limited to predetermined amounts which may be quickly and easily selected by the operator.

It is also our intention to provide mechanism whereby the work spindle may be automatically stopped at the completion of any carriage or cross slide travel.

Other features of our invention will be pointed out in the following description of the drawings in which:—

Figure I is a perspective view of the front of a lathe embodying the principles of our invention.

Figure II is a perspective view of the rear of the lathe shown in Figure I.

Figure III is a front elevation of the lathe shown in Figures I and II.

Figure IV is an enlarged front elevation of the carriage particularly showing the control mechanism for the carriage and cross slide.

Figure V is a rear elevation of the carriage.

Figure VI is a plan view of the carriage on the line VI—VI of Figures III, IV, V, VII, and XII shown with the cross slide removed.

Figure VII is a transverse section through the lathe on the line VII—VII of Figures III, IV, and V particularly showing the carriage and cross slide and associated mechanism.

Figure VIII is an enlarged front elevation of an indexing limit switch mounted on the carriage for controlling the cross slide and carriage travel.

Figure IX is a section on the line IX—IX of Figure VIII.

Figure X is a side elevation of the indexing limit switch shown in Figure VIII.

Figure XI is a transverse section through the lathe carriage on the line XI—XI of Figures III, IV, V, VI, and XIII.

Figure XII is a vertical transverse section of a portion of the lathe on the line XII—XII of Figures III, IV, and VI, particularly showing the control mechanism for the carriage mounted on the bed.

Figure XIII is a plan view of the indexing tool carrying turret.

Figure XIV is an enlarged section on the line XIV—XIV of Figure XIII.

Figure XV is an enlarged section on the line XV—XV of Figure XIII.

Figure XVI is a vertical transverse section through the lathe on the line XVI—XVI of Figure III particularly showing a carriage control limit switch mounted on the bed and the facing attachment mounted on the rear of the lathe.

Figure XVII is an enlarged rear elevation of a portion of the lathe particularly showing the facing attachment and the connecting mechanism between the attachment and the carriage.

Figure XVIII is a diagrammatic layout of the hydraulic feeding system and the electrical control circuit for said hydraulic system.

Figure XIX illustrates diagrammatically some of the forms of feeding cycles which may be obtained.

Figure XX is an elementary wiring diagram of the electrical circuit for the spindle drive motor and the hydraulic feed fluid pressure pump driving motor together with a simplified control circuit for tool carrier actuation when the lathe is arranged only for manual control of the feed and rapid traverse tool movements.

Figure XXI is an elementary wiring diagram of the complete control equipment utilized when the tool carrier is to be actuated fully automatically, the limit switches and drum type selector switch being here shown in positions which permit of manual actuation of the tool carrier as when setting the cutting tools preparatory to a production run under automatic operation.

Figure XXII is an elementary wiring diagram like that of Figure XXI but showing the positions of the various switches when the lathe is to be operated automatically in cycle A of Figure XIX.

Figure XXIII is an elementary wiring diagram like that of Figure XXI but showing the positions of the various switches when the lathe is to be operated automatically in cycle B of Figure XIX.

Figure XXIV is an elementary wiring diagram like that of Figure XXI but showing the positions of the various switches when the lathe is to be operated automatically in cycle C of Figure XIX.

Figure XXV is an elementary wiring diagram like that of Figure XXI but showing the positions of the various switches when the lathe is to be operated automatically in cycle D of Figure XIX.

As an exemplary disclosure we show our invention applied to a turret lathe comprising the usual bed 1, mounted on legs 2 and 3, upon which is mounted the headstock 4. Slidably mounted on the usual ways 5 of the bed 1 is the carriage 6 upon which is slidably mounted the cross slide 7 on suitable ways 8 of the carriage 6.

The lathe spindle 9 and its associated work holding devices 10 is rotated by the electric motor 11 mounted in the leg 3 which drives the usual change speed transmission gearing in the headstock 4. A suitable electrical push button control station 12 provides the usual manual means for starting, stopping, or inching the work spindle 9 by appropriately controlling the motor 11. The motor 11 may also be operated at a plurality of different speeds by manipulating the lever 13 of the electrical speed changing device 14.

The work holders 10 and the carriage 6 and cross slide 7 are actuated by hydraulic fluid pressure derived from the fluid pressure pump 15 which is constantly driven by the usual electric motor 16, mounted on the fluid supply tank 17 for the pump 15. Fluid pressure for operating the work holders 10 is delivered through lines 18 and 19 (Figure XVIII) through the pressure regulating valve 20 and the line 21 to the control valve 22. By properly manipulating the lever 23 of the valve 22 fluid pressure may be delivered from line 21 to either of the lines 24 or 25 for reciprocating the piston 26 in the cylinder 27 whereby the work holders 10 may be operated through conventional mechanism. Exhausted fluid from the cylinder 27 is discharged through line 28 into the drain line 29 into the tank 17.

The carriage 6 is actuated in rapid traverse and feed in either direction by the fluid pressure cylinder 30 fixed on the bed 1 of the lathe by suitable bolts 31. Reciprocatably mounted in the cylinder 30 is a piston 32 which is mounted on the piston rod 33 which passes outwardly through the cylinder heads 34 and 35 of the cylinder 30 so as to maintain the same displacement in both chambers each side of the piston 32. One end of the piston rod 33 is securely attached to a bracket 36 fixed on the carriage 6 by suitable bolts 37 whereby reciprocation of the piston 32 and rod 33 will cause like reciprocation of the carriage 6.

Mounted on the front of the bed 1 in proper relation to the carriage 6 is the fluid pressure control valve 38 and the feed rate control valve 39 for the cylinder 30. The control valve 38 is a five-way valve (Figure XVIII) having "rapid traverse left", "feed left", "neutral", "feed right", and "rapid traverse right" positions. When the control lever 40 is moved to the "rapid traverse left" position fluid pressure from the pump 15 is delivered through line 18, relief valve 41, line 42, through valve 38, line 43 into the chamber 44 of cylinder 30. Exhausted fluid from chamber 45 is allowed free escape through line 46, valve 38, and the drain line 29 into the tank 17. When the lever 40 is moved to "feed left" position pressure is applied to chamber 44 as when in "rapid traverse left" position. The exhaust fluid from chamber 45, however, is cut off from free escape through line 29 by valve 38 and is passed through line 47, the feed control valve 39, and the line 48 before discharging into the drain line 29. The valve 39 restricts the rate of flow of liquid from chamber 45 so as to produce a relatively slow feed movement for the carriage 6. By manipulating the control lever 49 of the feed rate control valve 39 any desired rate of carriage feeding may be selected. Reversal of the "rapid traverse" and "feeding" of the carriage from that described above is accomplished by moving the control lever 40 to "rapid traverse right" and "feed right" positions whereupon pressure is delivered to chamber 45 through line 46 and exhausted from chamber 44 through line 43 in the same manner as described above for "rapid traverse left" and "feed left" positions of the lever 40. When the lever 40 is moved to neutral position all pressure is removed from the cylinder 30 so as to maintain the carriage in a stationary position.

The cross slide 7 is similarly actuated as is the carriage 6 by a fluid pressure cylinder 50 fixed on the bracket 51 which in turn is secured to the rear of the carriage 6 by suitable bolts 52 and which has a piston 53 reciprocatably mounted therein on the piston rod 54 which passes outwardly through the cylinder heads 55 and 56 of the cylinder 50 so as to maintain the same displacement in both chambers each side of the piston 53. One end of the piston rod 54 has a flanged portion 57 which is securely fixed to the cross slide 7 by suitable bolts 58 whereby reciprocation of the piston 53 and rod 33 will cause like reciprocation of the cross slide 7.

Mounted on the rear of the carriage 6 is the fluid pressure control valve 59 and on the front of the carriage the feed rate control valve 60 for the cylinder 50. The control valve 59 is a five way valve (Figure XVIII) having "rapid traverse forward", "feed forward", "neutral", "feed back", and "rapid traverse back" positions. When the control lever 61 is moved to the "rapid traverse forward" position fluid pressure from the pump 15 is delivered through line 18, relief valve 41, line 42, through valve 59, line 62 into the chamber 63 of the cylinder 50. Exhausted fluid from chamber 64 is allowed free escape through line 65, valve 59, and the drain line 29 into the tank 17. When the lever 61 is moved to "feed forward" position pressure is applied to chamber 63 as when in "rapid traverse forward" position. The exhaust fluid from chamber 64, however, is cut off from free escape through line 29 by valve 59 and is passed through line 66, the feed control valve 60, and the line 67 before discharging into the drain line 29. The valve 60 restricts the rate of flow of liquid from chamber 64 so as to produce a relatively slow feeding movement for the cross slide 7. By manipulating the control lever 68 of the feed rate control valve 60 any desired rate of cross slide feeding may be selected. Reversal of the "rapid traverse" and "feeding" of the cross slide from that described above is accomplished by moving the control lever 61 to "rapid traverse back" and "feed back" positions whereupon pressure is delivered to chamber 64 through line 65 and exhausted from chamber 63 through line 62 in the same manner as described above for "rapid traverse forward" and "feed forward" positions of the lever 61. When the lever 61 is moved to neutral position all pressure is removed from the cylinder 50 so as to maintain the cross slide in a stationary position.

Mounted on the cross slide 7 is the indexing turret 69 having a plurality of T slots 70 for mounting suitable tool holders 71 with tools 72 for operating on work 73 in the work holders 10. The turret 69 is journaled on the tapered bearing surface 74 and the flat thrust bearing surface 75 of the cross slide 7. Suitable clamping mechanism is provided for binding the turret to the cross slide comprising semi-circular clamping rings 76 and 77 having annular tapered grooves 78 adapted to engage the tapered bearing surfaces 79 and 80 of the turret and cross slide respectively. At one end the rings are connected together by a suitable bolt 81. The other ends of the rings are adapted to be drawn together or moved away from each other for clamping or unclamping the turret and the cross slide. Pivotally mounted on the clamp 76 by pin 82 is the link 83 and pivotally mounted on the clamp 77 by pin 84 is the link 85. On the cross slide 7 is journaled the vertical rock shaft 86 in suitable bearings 87 and 88 the upper part of which has concentric bearing surfaces 89 about which is pivotally mounted the bifurcate end 90 of the link 85 and an eccentric bearing surface 91 between the concentric bearing surfaces 89 about which is pivotally mounted the link 83. A suitable lever 92 fixed on the shaft 86 provides means for rotating the shaft whereby the rings 76 and 77 may be moved for clamping or unclamping action.

Fixed on the turret 69 is the annular indexing ring 93 (Figure XII) having the four indexing slots 94 adapted to be engaged by a suitable indexing plunger 95 slidably mounted in the cross slide 7. The plunger 95 is automatically withdrawn from an indexing slot 94 when the lever 92 is moved to unclamping position by the projection 96 on said lever 92 which abuts against the side 97 of the slot 98 formed in the plunger 99 which has the rack 100 formed thereon for rotating the pinion 101 journaled on stud 101a in the cross slide 7 which engages in the rack 102 formed on the indexing plunger 95. When the lever 92 is moved to clamping position, the projection 96 leaves the slot 98 in plunger 99 permitting the spring 103 to automatically return the indexing plunger 95 toward the ring 93 and an indexing slot 94.

The "rapid traverse" and "feeding" movements of the carriage 6 and cross slide 7 are automatically controlled in a variety of predetermined different cycles of operation as required for various different types of work to be machined by suitable electrical control mechanism. The control lever 40 (Figures IV and XII) for the carriage feed control valve 38 is pivotally mounted on the stud 104 fixed in the bracket 105 mounted on the bed 1 by suitable screws 105a. The lever 40 is connected by a suitable link 106 to the bell crank lever 107 pivotally mounted on the stud 108 fixed in the bracket 105; bell crank lever 107 in turn is connected to the stem 109 of the control valve 38 whereby vertical swinging movement of the lever 40 actuates the valve 38; the extreme "up" position of the lever 40 being the "rapid traverse left" position of the control valve and the extreme "down" position of the lever being the "rapid traverse right" position of the control valve's suitable detent mechanism 110 is provided for properly locating the lever 40 in the various "rapid traverse", "feed" and "neutral" positions for the valve 38. A dog 111 is adjustably mounted in the T slot 112 of the bar 113 fixed on the carriage 6 and is adapted to strike the projection 114 of the lever 40 as the carriage moves to the left to thereby automatically move the lever 40 from "rapid traverse left" to "feed left" position.

A solenoid 115 is appropriately connected to the bell crank lever 107 and is adapted when energized to move the lever 40 and the valve 38 to "rapid traverse right" position.

Mounted in the carriage 7 is the rock shaft 116 (Figures V, VI, VII, and XVIII) having a bell crank 117 fixed thereon at the rear of the carriage 7 which is connected to the stem 118 of the valve by appropriate linkage 119; the control lever 61 being fixed on the shaft 116 at the front of the carriage whereby the valve 59 may be conveniently operated by manipulating the lever 61. Suitable detent mechanism 120 associated with the bell crank lever 117 is provided for properly locating the lever 40 in the various "rapid traverse", "feed", and "neutral" positions for the valve 59.

Also fixed on the shaft 116 at the rear of the carriage are bell crank levers 121 and 122, the lever 121 being connected to solenoids 123 and 124 and the lever 122 being connected to solenoids 125 and 126 by appropriate linkage 127. Solenoid 123 when energized is adapted to move the valve 59 to "feed back" position; solenoid 124 when energized is adapted to move the valve 59 to "forward" position; solenoid 125 when energized is adapted to move the valve 59 to "rapid traverse back" position; and solenoid 126 when energized is adapted to move the valve 59 to "rapid traverse forward" position.

Adjustably mounted on the ways 5 of the bed 1 (Figure III) by a suitable bracket 128 each side of the carriage 6 are the carriage control limit switches 129 and 130, the limit switch 129 being actuated by movements of the carriage to the left and the switch 130 by movements of the carriage to the right. Similar limit switches 131 and 132 (Figure VII) are mounted on the carriage 6 each side of the cross slide 7 and are adapted to be actuated by movements of the cross slide, the limit switch 131 being actuated by forward movements of the cross slide 7 and the switch 132 by backward movements of the cross slide 7.

All of the solenoids 115, 123, 124, 125 and 126 and the limit switches 129, 130, 131, and 132 are electrically connected by means of suitable conductors 88 to appropriate relays and contactors (not shown) in the control cabinet 134 mounted on the leg 2 of the lathe. Also mounted in the cabinet 134 is a conventional drum type selector switch (not shown) which may be operated by inserting a suitable operating handle in the socket 135 for rotating the drum switch whereby various combinations of hookups of the solenoids, limit switches, relays, and contactors may be quickly obtained in the usual manner thereby providing a rapid means for selecting various predetermined cycles of operation for the lathe for properly handling different pieces of work. In addition to this automatic control of the feeding mechanism the lathe is also under full manual control at all times merely by properly manipulating the control levers 40 and 61 which are capable of producing all feeding functions which may be required of the lathe.

The limit switches 129, 130, 131, and 132 not only control the electrical apparatus mentioned above but each acts as a positive abutment for accurately limiting the extent of travel of the carriage 6 and cross slide 7. These limit switches are also adapted to automatically give a particular predetermined amount of carriage and cross slide travel for each indexed position selected for the turret 69.

The structure of these limit switches is particularly shown in Figures VIII, IX, X, XI, and XVI. In a bore 136 in the bracket or body portion 128 is slidably mounted the bushing 137. The bushing 137 has a reduced end portion 138 which slidingly fits in the smaller bore 139 in the portion 128. A coil spring 140 surrounding the end portion 138 and bearing against the face 141 of the bushing 137 and the bottom 142 of the bore 136 serves to yieldingly urge the bushing axially of the bore 136 (to the right as shown in Figure IX). A set screw 143 threaded in the portion 128 has a projecting end 144 in the bore 136 which engages in the slot 145 to prevent rotating of the bushing 137 in the bore 136 and to limit outward movement of the bushing under the influence of the spring 140. Inward movement of the bushing 137 is limited by the flange 146 abutting against the face 147 of the portion 128. Threaded in tapped holes 148 in the bushing 137 are abutment screws 149 corresponding in number to the number of indexing positions of the turret 69. In counterbore 150 are rotatably mounted the graduated bushings 151 which are caused to rotate with the screws 149 by the pin 152 fixed in said bushings and slidably engaging in the slots 153 in the screws 149 to facilitate accurate axial setting of the screws 149 in the bushing 137. A suitable lock nut 154 is provided for securing the screws 149 and bushings 151 in adjusted position. A suitable snap action switch mechanism 155 is adapted to be operated by axial movement of the bushing 137 through the lever arm 156 having a pin 157 engaging a notch 158 provided in the periphery of the bushing 137.

Fixed on the turret 69 co-axial with its axis of rotation is the bevel pinion 159 (Figure XI) which engages a mating pinion 160 fixed on the shaft 161 journaled in suitable bearings 162 in the cross slide 7. Fixed to the projecting ends of the shaft 161 are the selective abutment dogs 163 and 164 which are capable of being rotated upon rotation of the turret 69 to cover the various clearance holes 165 into which the screws 149 of the limit switches 131 and 132 may freely enter upon movement of the cross slide 7. Thus, when the head 166 of a set screw 149 strikes the surface 167 of the dog 163 or 164 the limit switch associated therewith will be operated and the movement of the cross slide arrested at a definite predetermined point when the flange 146 engages the surface 147 of the portion 128 of the limit switch. By setting the screws 149 in different axial positions in the bushing 137 various accurate predetermined lengths of cross slide travel may be easily obtained.

In a similar manner the carriage travel is controlled. Fixed on the shaft 161 is a gear 168 which is adapted to drive the cylindrical gear 169 fixed on the shaft 170 suitably journaled in bearings 171 in the carriage 6 whereby said shaft 170 may be at all times rotated by rotation of the turret 69 regardless of the relative position of the cross slide 7 on the carriage 6. On the shaft 170 is fixed a bevel pinion 172 (Figure VI) which engages bevel pinions 173 and 174 mounted on shafts 175 and 176 respectively journaled in the carriage 7. On the projecting ends of the shafts 175 and 176 are respectively fixed the selective abutment dogs 177 and 178 which are capable of being rotated upon rotation of the turret 69 to cover the various clearance holes 179 into which the screws 149 of the limit switches 129 and 130 may freely enter upon movement of the carriage 6. Thus, when the head 166 of a set screw 149 strikes the surface 180 of the dog 177 or 178 the limit switch associated therewith will be operated and the movement of the carriage arrested at a definite predetermined point when the flange 146 engages the surface 147 of the portion 128 of the limit switch. By setting the screws 149 in different axial positions in the bushings 137 various accurate predetermined lengths of carriage travel may be easily obtained.

In Figure XIX is illustrated a few of the more common forms of feeding cycles which may be obtained with this apparatus.

At the beginning of cycle A the carriage 6 is to the right contacting limit switch 130 and the cross slide 7 is back contacting limit switch 132. The operator raises the lever 40 to "rapid traverse left" position causing the carriage to travel to the left until the tools 72 are brought into proper relation with the work whereupon the operator depresses the lever 40 downward to "feed left" position for feeding of the carriage 6 to the left. The shifting of lever 40 from "rapid traverse left" to "feed left" position may also be automatically accomplished by setting the dog 111 on the carriage to strike the projection 114 of the handle 40 at the proper position of carriage travel. The carriage feeds to the left until it contacts the limit switch 129 at which time the switch mechanism 155 is operated and the carriage brought to a stop and maintained against the limit switch 129 by the hydraulic cylinder, the back pressure built up therein escaping through the relief valve 41, the line 181 (Figure XVIII) into the drain line 29. When the switch mechanism 155 of the limit switch 129 is actuated solenoid 124 is energized to move valve 59 to "feed forward" position whereupon the cross slide 7 feeds forward moving away from limit switch 132 and continuing until limit switch 131 is contacted thus actuating said switch and arresting the forward movement of the cross slide 7 the back pressure in the cylinder 50 escaping through relief valve 41, line 181 into the drain line 29.

Actuation of switch 131 operates appropriate relays and contactors in the control cabinet 134 whereby power is cut off from the spindle driving motor and the spindle brought to a stop. Actuation of switch 131 also energizes solenoid 125 moving valve 59 to "rapid traverse back" position for rapidly returning the cross slide 7 away from limit switch 131 and into contact with limit switch 132 which arrests said traverse movement of the cross slide and causes solenoid 115 to be energized whereupon the valve 38 is moved to "rapid traverse right" position for rapidly returning the carriage to initial starting position of cycle A.

At the beginning of cycle B the carriage 6 is to the right contacting limit switch 130 and the cross slide 7 is forward contacting limit switch 131. The operator raises the lever 40 to "rapid traverse left" position causing the carriage to travel to the left until the tools 72 are brought into proper relation with the work whereupon the lever 40 is tripped by the dog 111 to "feed left" position. The carriage then feeds to the left until it contacts the limit switch 129 at which time the switch is actuated and the carriage brought to a stop as in cycle A. Actuation of switch 129 energizes solenoid 123 to move valve 59 to "feed back" position whereupon the cross slide 7 feeds backward moving away from limit switch 131 and continuing until limit switch 132 is contacted thus actuating said switch and arresting the backward movement of the cross slide 7 the back pressure in cylinder 50 escaping through relief valve 41 as in cycle A.

Actuation of switch 132 operates appropriate relays and contactors in the control cabinet 134 whereby power is cut off from the spindle driving motor and the spindle brought to a stop. Actuation of switch 132 also energizes solenoid 126 moving valve 59 to "rapid traverse forward" positioning for rapidly returning the cross slide 7 away from limit switch 132 and into contact with limit switch 131 which arrests said traverse movement of the cross slide and causes solenoid 115 to be energized whereupon the valve 38 is moved to "rapid traverse right" position for rapidly returning the carriage to initial starting position of cycle B.

Cycle C is similar to cycle A excepting that at the completion of the forward feeding movement of the cross slide 7 the limit switch 131 is actuated which energizes the solenoid 115 to move valve 38 to "rapid traverse right" position for rapidly moving the carriage to the right to contact limit switch 130 whereupon solenoid 125 is energized to rapidly return the cross slide 7 to initial starting position of cycle C.

Cycle D is similar to cycle B excepting that at the completion of the backward feeding movement of the cross slide 7 the limit switch 132 is actuated which energizes the solenoid 115 to move valve 38 to "rapid traverse right" position for rapidly moving the carriage to the right to contact limit switch 130 whereupon solenoid 126 is energized to rapidly return the cross slide 7 to initial starting position of cycle D.

Associated with the carriage 6 and actuated by the movement thereof is a facing attachment (Figures XVI and XVII) comprising a bracket 182 adjustably mounted on the bed 1 by appropriate bolting means 183. Fixed on the rock shaft 184 journaled in suitable bearings 185 and 186 in the bracket 182 is the tool supporting arm 187 having appropriate means 188 for supporting facing tools 189. Clamped to the rock shaft 184 by the screw 190 and secured for rotation thereon by a suitable key 191 is the segmental member 192 having an arcuate slot 193 through which passes a bolt 194 into the counterweight member 195 pivotally mounted about the rock shaft 184 whereby the member 192 is adjustably bound to the member 195.

A cam plate slide 196 slidably mounted in the bracket 182 is attached to the carriage 6 by a suitable bracket 197 whereby reciprocation of the carriage causes like reciprocation of the slide 196. On the slide 196 is mounted a suitable cam 198 which is adapted to engage the follower 199 pivotally mounted on the pin 200 in the projecting end portion 201 of the member 195 whereby movement of the slide 196 causes the arm 187 and its tools 189 to swing toward the work the counterweight 202 attached to the member 195 serving to return the tool from the work and to at all times maintain the follower 199 in contact with the cam 198.

Having fully set forth and described our invention, what we claim as new and desire to secure by United States Letters Patent is:

1. In a lathe, a bed, a carriage movable on said bed, hydraulic motive means for moving said carriage, a source of fluid pressure for said motive means, a control valve between said motive means and said source of fluid pressure adapted when operated to cause said carriage to move in feed or rapid traverse speeds in either direction or to arrest said carriage movement, manual means for operating said valve to cause said carriage to move in rapid traverse speed in one direction, means on said carriage to operate said valve to cause the carriage to move in said direction at feeding speed, and a solenoid adapted when energized to operate said valve to cause the carriage to move in rapid traverse speed in the other direction.

2. In a lathe, a carriage, a cross slide movable on said carriage, hydraulic motive means for said cross slide, a source of fluid pressure for said motive means, a control valve between said motive means and said source of fluid pressure having rapid traverse and feed positions for both directions of cross slide movement, and solenoids connected to said valve, one for each of said rapid traverse and feed positions, adapted to be energized for selecting any of said positions of said valve.

3. In a lathe, a carriage, a cross slide movable on said carriage, hydraulic motive means for said cross slide, a source of fluid pressure for said motive means, a control valve between said motive means and said source of fluid pressure having rapid traverse and feed positions for both directions of cross slide movement and a neutral position, manual means for selecting any of said positions, and solenoid operated means for selecting any of said rapid traverse or feed positions.

4. In a lathe, a bed, a carriage movable on said bed, hydraulic motive means for moving said carriage, a cross slide movable on said carriage, hydraulic motive means for said cross slide, a source of fluid pressure for said motive means, a control valve between said source of fluid pressure and each of said motive means for controlling the movements of the carriage and cross slide, electrical means for operating said control valves, means fixed on the bed and the carriage for respectively accurately limiting the extent of said carriage movement and for controlling said electrical means.

5. In a lathe, a bed, a carriage movable on said bed, motive means for said carriage, electrical means for controlling said motive means, and a limit switch comprising a member fixed on the bed of the lathe, a member resiliently mounted in said member adapted to be engaged by the carriage and to be moved by said carriage to a positive stop against said first mentioned member, and an electrical switch, operated by the movement of said second mentioned member, for rendering said electrical means effective or ineffective.

6. In a lathe, a bed, a carriage movable on said bed, motive means for said carriage, an indexing turret mounted on said carriage, electrical means for controlling said motive means, a limit switch for controlling said electrical means and also serving as a positive abutment to definitely limit the extent of travel of said carriage, and means operated by the indexing of said turret to cause said limit switch to limit said carriage travel to a predetermined amount for each indexed position of said turret.

7. In a lathe, a bed, a carriage movable on said bed, a cross slide movable on said carriage, an indexing turret mounted on said cross slide, motive means for said carriage and cross slide, electrical means for controlling said motive means, limit switches mounted on the bed and the carriage for controlling said electrical means and also serving as positive abutments to definitely limit the extent of travel of said carriage and cross slide, and means operated by the indexing of said turret to cause said limit switches to limit said carriage and cross slide travel to a predetermined amount for each indexed position of said turret.

8. In a lathe, a bed, a carriage movable on said bed, a cross slide movable on said carriage, hydraulic motive means for said carriage and for said cross slide, an electrically operated control valve for each of said motive means, limit switches associated with and operated by the movements of the carriage and cross slide, a selector switch interconnected with said electrically operated control valves and said limit switches, and manual means for operating said selector switch whereby a plurality of predetermined different operating cycles for the carriage and cross slide may be obtained.

WILLIAM F. GROENE.
HAROLD J. SIEKMANN.